United States Patent [19]
Peek

[11] 3,835,837
[45] Sept. 17, 1974

[54] HUMAN PULSE RATE MEASURING APPARATUS

[76] Inventor: Sandford C. Peek, 111 Summer St., Hingham, Mass. 02043

[22] Filed: Sept. 13, 1972

[21] Appl. No.: 288,713

[52] U.S. Cl. .......................................... 128/2.05 P
[51] Int. Cl. ............................................. A61b 5/02
[58] Field of Search...... 128/2.05 P, 2.05 A, 2.05 F, 128/2.05 M, 2.05 N, 2.05 S, 2.05 T, 2.06 A, 2.06 F, 2.05 R, 2.06 R

[56] References Cited
UNITED STATES PATENTS

| | | | |
|---|---|---|---|
| 3,156,235 | 11/1964 | Jaeger............................ | 128/2.06 A |
| 3,187,098 | 6/1965 | Farrar et al. ................ | 128/2.05 P X |
| 3,384,075 | 5/1968 | Mitchell........................ | 128/2.06 F |
| 3,426,747 | 2/1969 | Herman et al................. | 128/2.05 P |
| 3,482,565 | 12/1969 | Gowen........................... | 128/2.05 A |
| 3,556,084 | 1/1971 | Budde ........................... | 128/2.05 P |
| 3,613,670 | 10/1971 | Edenhofer..................... | 128/2.06 F |

FOREIGN PATENTS OR APPLICATIONS

| | | | |
|---|---|---|---|
| 91,988 | 7/1968 | France........................... | 128/2.05 P |
| 921,396 | 3/1963 | Great Britain................. | 128/2.05 S |

OTHER PUBLICATIONS

Averbach, "Converting Heart's Motion", Washington Post, Sept. 22, 1970, City Life Section, pp. C1 & C2.

*Primary Examiner*—Richard A. Gaudet
*Assistant Examiner*—Lee S. Cohen

[57] ABSTRACT

The specification describes a portable human pulse rate indicator and measuring apparatus which provides an indication of human pulse rate and a timing indication so that both absolute pulse rate and pulse rate changes may be detected. Noise immunity is provided by the use of an LDR detector having poor high frequency response and through the use of low pass filters. The sensor employed utilizes light passing through an extremity of the human hand to the LDR detector providing both accurate generation of the pulse signal and virtual elimination of the generation of artifacts.

4 Claims, 4 Drawing Figures

PATENTED SEP 17 1974

HUMAN PULSE RATE MEASURING APPARATUS

BACKGROUND OF THE INVENTION

In U.S. Pat. No. 3,139,086, issued June 30, 1964, in the names of Botsch and Sacco, the entire field of human pulse rate measuring devices is reviewed. As described therein, the number of methods and approaches have been utilized to sense the human pulse. The advantages and disadvantages of the methods discussed are described. The present invention represents a material improvement over the devices described by the Botsch and Sacco patent.

This invention relates generally to heartbeat timing devices. In the art such devices have generally incorporated bulky amplifiers, timing circuitry and cabinets which were suitable for bedside or doctor office work. The transducers which transform the heartbeat into an electrical signal have been inconvenient to attach to the body and use in portable devices. There are, however, many circumstances where a small, portable, inexpensive, easy to use instrument is needed in order for the user to obtain immediate indications of his heart pulse rate. Joggers or cardiac sufferers, for instance, need to know what their pulse rate is periodically in order not to exceed some maximum specified by their physician. A portable instrument would allow them an opportunity to determine what activities would be safe for their particular physical condition. Furthermore, unwanted signals or artifacts (high frequency noise) are still evident in devices now on the market, especially when the user moves about. The combination of design parameters used in the invention herein described, greatly lowers the artifacts or unwanted signals. Also, previous models have produced inaccurate indications of pulse rate. The invention herein described, produces a signal at each beat of the heart which can be counted for an interval of time, thereby resulting in accuracies dependent only upon the timer signal accuracy. In addition, the production of a signal for each heartbeat provides a means of checking regularity which may in certain cases, be more important than pulse rate.

SUMMARY OF THE INVENTION

Generally speaking, in accordance with the invention, a hand-held, battery operated device having a source of light the output of which passes through the user's finger to a photosensitive receiver; an amplifier; and an indicator which produces an audio, visual or touch signal or any combination thereof, each time the heart beats and an internal accurate timer which also produces a signal, the timer being set for a fixed interval such as 6 seconds, is provided.

The pulse timer includes a small case capable of being held in the hand or mounted to the wrist; a light source and light sensitive detector positioned such that a finger can be placed between them both mounted in an enclosure such that ambient light is shielded from that portion of the finger placed between said light source and light sensitive detector; an integrated circuit AC amplifier capable of amplifying the electrical pulse emitted by the light sensitive detector, and a circuit which is triggered by the resulting electrical pulse which, in turn, flashes a light and/or produces a signal in a speaker or other transducer which provides an audio or touch signal in synchronism with the heartbeat. The pulse timer also includes a timing circuit consisting of a unijunction transistor which produces an electrical impulse at regular intervals (such as 6 seconds); a circuit which is triggered by this impulse and in turn flashes a signal light and/or produces a signal which when applied to the above-mentioned transducer, provides a signal distinguishable from the signal which represents the heartbeat.

A portion of the device, such as the case containing the batteries, circuitry, signal lights and speaker or transducer may be mounted on the wrist or carried in the hand while the light source and light sensitive detector may be mounted remotely, for instance, on one of the fingers or on either side of the web of skin between the thumb and index finger.

Accordingly, it is the object of this invention to provide a heartbeat pulse timer whereby the device may be easily carried about. A further object of this invention is to provide a pulse timer of very low battery drain and to provide an accurate means of determing the pulse rate independent of the length of time the batteries have been used, thereby providing longer useful battery life.

A further object of this invention is to provide an economical heartbeat indicator so that the regularity of heartbeats can be determined. If a premature ventricular contraction occurs, it can be recognized in time to take corrective action against an often fatal ventricular fibrillation.

A further object of the invention is to provide means for determining heartbeat rate and regularity in a confidential manner through the use of a transducer the output of which can be felt by touch.

Still other objects and advantages of the invention will in part be obvious and will in part be apparent from the specification and drawings in which.

DESCRIPTION OF MECHANICAL CONFIGURATION

Figure 1:
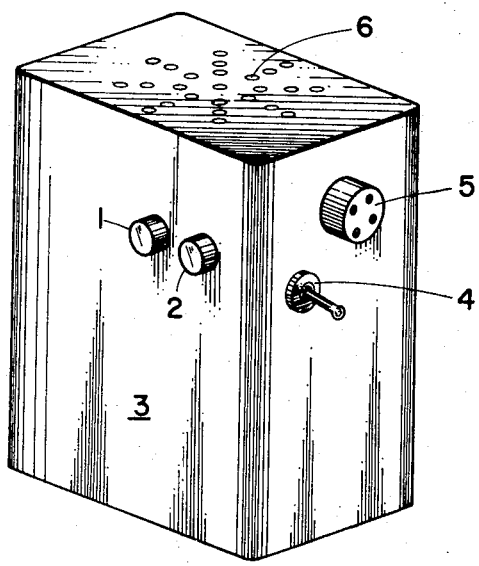
FIG. 1 is an isometric view of a housing for apparatus in accordance with the invention.

FIG. 1 shows the physical layout of the principal embodiment of the invention. The main enclosure for this embodiment is shown in FIG. 1. It consists of a small rectangular plastic box approximately 1 ½ × 2 × 3 ¾ inches which contains the circuitry, rechargeable battery, two indicator lights, a receptacle for a transducer, an on-off switch, and a miniature speaker. One version of the transducer is shown in FIG. 2 which consists of a plug, a light bulb and reflector, a light sensitive detector and a flexible finger cup.

Referring to FIG. 1, the plastic case, 3 encloses the workings of the device in such a way that it can be easily held in the palm of one's hand. A miniature speaker is mounted at the top of the enclosure in such a manner that the sound can pass through the grill work, 6 at the top of the enclosure. This arrangement makes it convenient to hold the instrument close to one's ear for sure audio detection of the signals. A switch, 4 serves to turn the instrument "off" and "on" and allows for battery charging while in the "off" mode. The socket, 5 with four holes is designed to receive either the plug from the battery charger or the transducer without interference of functions. The signal light 2 flashes on each time a heartbeat occurs. The signal light 1 flashes once every 6 seconds, thereby supplying a timing pulse. The user need only multiply the number of flashes he sees from the signal light, 2 between flashes from the signal light, 1 by 10 in order to determine his pulse rate.

The speaker puts out a short, sharp audio pulse on each beat of the heart and a short buzzing note synchronized with the signal light indirectly the 6-second timing intervals.

Figure 2:
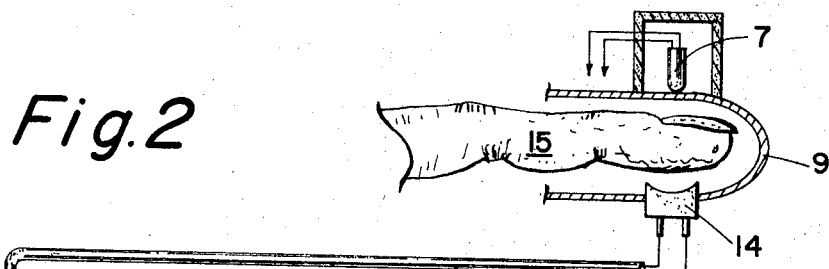
FIG. 2 is partially a section and a schematic of a finger cup and plug connector employed with the housing shown in FIG. 1.

The transducer which is shown in FIG. 2 consists of a flexible finger cup 9 that is connected to plug P through cable 16, plug P having connector terminals 17, 18, 19 and 20. The cup can be made in different sizes for different sized fingers but it has been found that a cup ⅝ inch inside diameter will fit some convenient finger for most people. The light from the bulb 7 which, in the case of the example, is a 6 volt 60ma T1 ¾ incandescent bulb, penetrates the finger, 15 and impinges on the light dependent resistor (LDR) cell 14. This type of light sensitive detector changes resistance as the light changes. As blood pulsates through the finger, there is a reduction in the amount of light impinging on the LDR, 14 and an AC signal is fed to an amplifier and filter circuit further described in detail. The amplified electrical pulses cause a light emitting diode (LED)[1] (FIG. 1) to flash in synchronism with the heartbeat. A timing circuit which is designed to be independent of battery voltage and temperature causes a 150 cycle "beat" to be emitted by the speaker and at the same time another LED, 2, is flashed every 6 seconds.

In the preferred embodiment, only two types of signal presentation are shown: audio (speaker $T_1$) and visual (lights 2 and 3). It is within the scope of this invention to utilize pressure generating means so as to provide a touch response to both pulse rate and reference signals. A suitable pressure generating transducer for this is an earphone similar to the type used with portable radio receivers modified so that the diaphram can be touched.

Figure 4:
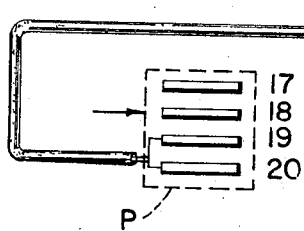
FIG. 4 is a sectional view of a touch indicator that may be employed with the apparatus shown in FIG. 1.
Figure 4:
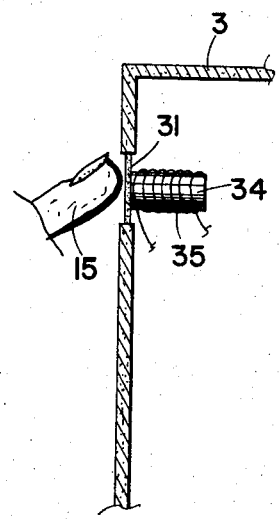

This is shown in FIG. 4 wherein an aperture is shown in the housing 3 containing a diaphram 31. The diaphram is small in diameter, for example, less than one-half inch so that it will not couple a significant amount of acoustic energy to the surrounding air thereby assuring that the diaphram will not act as a speaker. Diaphram 31 is connected to coil form 34 and coil 35 such as are used in an earphone or speaker. The finger may be held against the diaphram to receive an indication of heartbeat.

Figure 3:
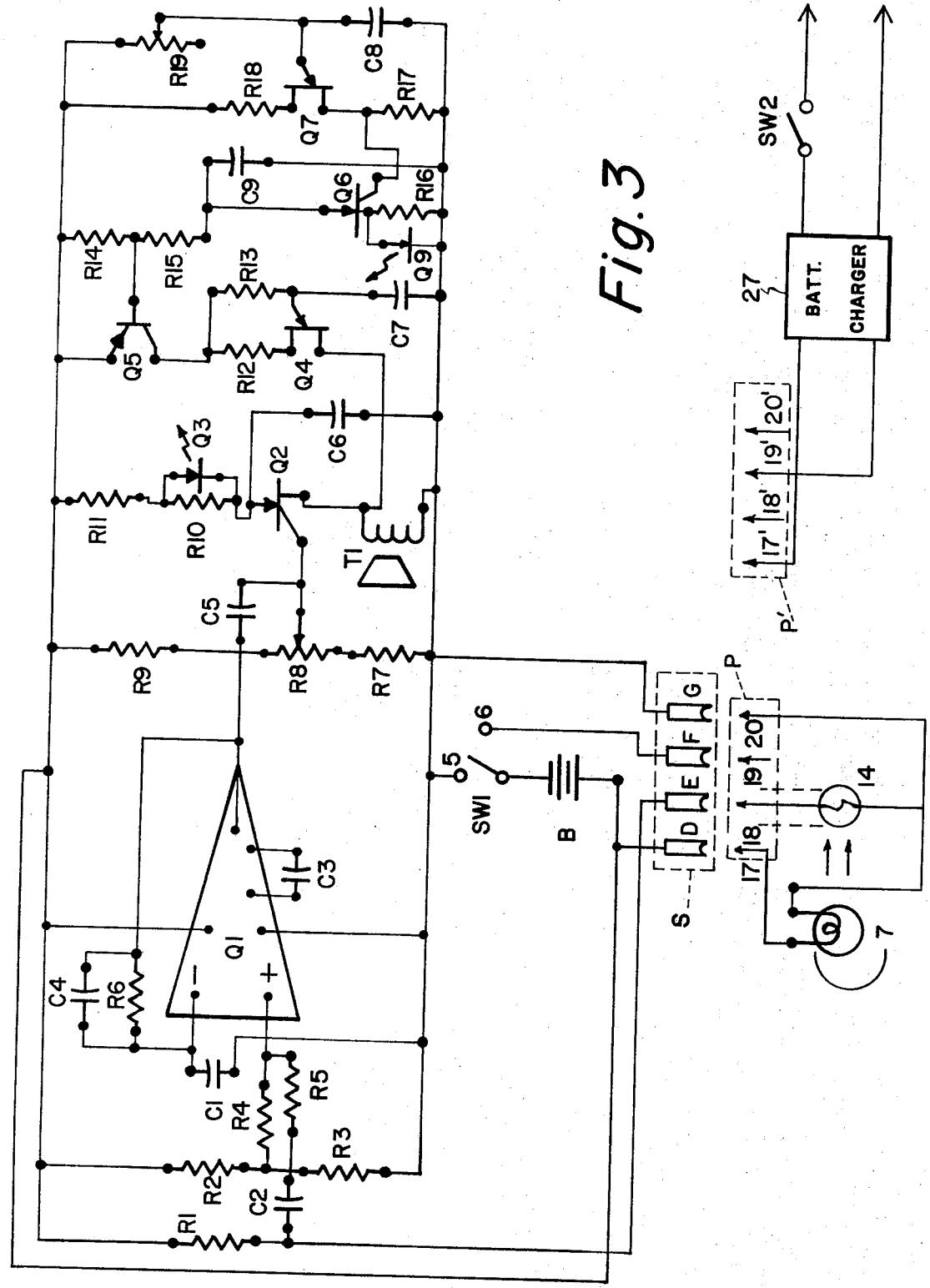
FIG. 3 is a schematic diagram of a preferred embodiment of electrical circuitry in accordance with the invention.

FIG. 3 is a schematic diagram of one embodiment of the pulse timer. An incandescent miniature bulb L and the light dependent resistor $Q_8$ are mounted in the transducer shown in FIG. 2 and are connected to the pins of a plug P having terminals 17, 18, 19, and 20. The "hot" lead 18 is connected to LDR $Q_8$ and its outer shield is connected to pin 20, which is grounded. This lead 20 is also connected to the outer case of the LDR so that the finger is grounded when it comes in contact with this outer case during use of the instrument. This grounds any stray voltage which may be picked up from finger or lead wires and prevents such stray voltage from entering the amplifier input. A rechargeable battery B is connected to pin D of a socket, S which mates with the plug as shown. The negative side of the battery, B is connected to a switch $S_{w1}$ which will connect the battery to the circuit when in position 5 and connects the battery B to pin F when in switch position 6. When switch $S_{w1}$ is in position 5, voltage will be applied to the entire circuit including the lamp bulb 7 with the transducer plugged in by a plug P' (which has terminals 17', 18', 19', and 20'). When the battery charger, 27 is plugged in, and the switch $S_{w1}$ is in position 6, the battery charger 27 will be connected across the battery B terminals for charging. Thus one sockets serves two purposes: the reception of the transducer; and the reception of the battery charger, with no interference of functions.

With plug P connected to socket S (which has terminals D, E, F and G), voltage is applied to the LDR 14 through the resistor $R_1$. Since the resistance of 14 increased as the light striking it is reduced due to the blood flowing through the finger, the current through $R_1$ is reduced, reducing the voltage drop across it and thereby increasing the voltage appearing at the input terminal of the capacitor $C_2$. Since the blood flows in a burst or pulse, the voltage appearing at capacitor $C_2$ will also be a pulse which will pass through capacitor $C_2$ and through resistor $R_5$ to the + terminal of operational amplifier $Q_1$. The DC offset voltage is balanced out by proper choice of the resistors $R_2$, $R_3$ and $R_4$. The capacitor $C_1$ serves to bypass the AC voltage appearing at the negative input terminal. The feedback resistor, $R_6$, is large compared to the input resistance so that the gain of the amplifier is large. The value of $R_6$ was 5.1 megohms in the embodiment herein described. The feedback capacitor $C_4$ provides a low impedance for the high frequency components thereby causing the amplifier to have high gain at low frequency and lower gain for low frequencies. Since the heartbeat waveform is made up primarily of low frequency components, the low pass filtering action of $R_6$ and $C_4$ tends to accentuate the signal in relation to artifacts or noise which are primarily made up of high frequency components. The capacitor $C_3$ serves to perform a similar function which is well known in operational amplifier theory.

The amplifier output is applied to the gate of an SCR, $Q_2$, through a capacitor $C_5$. The capacitor $C_5$ serves to isolate the output terminal of the operational amplifier from the DC voltages of the remainder of the circuit. The gate of SCR $Q_2$ is biased to a voltage slightly below its firing voltage by the adjustment of the potentiometer $R_8$. Resistors $R_7$ and $R_9$ serve to limit this bias voltage to appropriate values for practical operation of the instrument. If the subject has a thick or opaque finger, the bias voltage can be adjusted to a high value thereby increasing the sensitivity. If the finger is more transparent, the bias voltage should be adjusted to a lower value which prevents extraneous signals. As the battery voltage reduces during use, the bias voltage can be increased. When the adjustment gets near its limit an indication is provided that it is time to recharge the batteries.

A capacitor $C_6$ is charged through the resistor $R_{11}$ and the parallel combination of resistor $R_{10}$ and light emitting diode (LED) $Q_3$. The LED $Q_3$ flashes during the charging of $C_6$ due to the inrush of current. When a signal appears at the gate of the SCR $Q_2$ as a result of a heartbeat, SCR $Q_2$ will fire and discharge the capacitor $C_6$ through a speaker coil $T_1$. This produces an audio pulse to be emitted from the speaker. When the capacitor $C_6$ is discharged, SCR $Q_2$ will stop conducting and capacitor $C_6$ will be recharged causing the LED $Q_3$ to flash almost simultaneously with the audio signal. Thus both an audio and visual signal is given on each beat of the heart. A low pass frequency filtering system improves the signal to noise ratio, which discourages artifacts while an adjustable bias voltage both compensates for different transmissions of the subject's fingers and serves as an indication of low battery voltage.

The remainder of the circuit provides a timing signal so that one can count the number of pulses which occur in a given time interval, thereby resulting in pulse rate information. A unijunction transistor $Q_7$ is properly biased by resistors $R_{18}$ and $R_{17}$. The emitter electrode is connected to a capacitor $C_8$ which is charged through a resistor $R_{19}$. The time constant of the RC circuit ($C_8$, $R_{19}$) just mentioned can be adjusted to cause unijunction $Q_7$ to fire at 6-second intervals. The accuracy of such a unijunction timing circuit is quite good despite battery voltage fluctuations. When the unijunction $Q_7$ discharges capacitor $C_8$ through resistor $R_{17}$, a positive voltage appears at the gate of the SCR $Q_6$ thereby causing it to fire and to discharge the capacitor $C_9$ through the LED $Q_9$. The LED $Q_9$ will emit a flash of light which will be an indication that a specific period of time has transpired since the last flash. The resistor $R_{16}$ bypasses some of the current around the LED $Q_9$ so that it will not be overloaded and so that the capacitor $C_9$ will discharge completely enough to turn off the SCR $Q_6$. The capacitor $C_9$ will then be recharged through the resistors $R_{14}$ and $R_{15}$. The current that flows through $R_{14}$ will cause a positive voltage to appear at the base of the transistor $Q_5$ rendering $Q_5$ conductive during the time required to charge capacitor $C_9$. This conduction causes the unijunction oscillator comprising unijunction $Q_4$, capacitor $C_7$ and resistors $R_{12}$ and $R_{13}$ to oscillate and to cause a tone to be emitted from the speaker during the time it takes to charge $C_9$. The tone in this case is at a frequency of approximately 150 Hz and of a duration of approximately one-fourth seconds. The tone is thus easily distinguishable from the heartbeat audio tones.

The relaxation oscillation circuit $Q_4$, $Q_5$ and associated components provide the distinguishable reference tone to speaker $T_1$. The unijunction transistor $Q_4$ is controlled by the "on," "off" state of transistor $Q_5$ which is in turn controlled by the capacitor $C_9$. Thus, the time constant of capacitor $C_7$ determines the frequency of the relaxation oscillator to produce the distinguishable tone.

Noise immunity is provided in the present invention because of the use of LDR 14 and the low pass filter arrangement at the input to the amplifier $Q_1$. It has been found that the severe noise problems in these devices are of a high frequency. LDR 14 has poor high frequency response with further filtering of high frequencies provided by the amplifier input filter arrangement. LDR 14 is a cadmium sulfide interplaced photocell, manufactured by Clairex Company, Model Number CL705HL.

The present invention enables the detection of irregular heartbeat action by providing a direct analog in audio, visual or pressure form of the beat of the heart. This irregular action is quite distinguishable upon examination of the three alternative extensive mechanisms provided.

I claim:

1. Apparatus for measuring and indicating human pulse rate comprising transducer means for sensing the human pulse and generating an electrical signal in response to each sensed pulse;

a portable housing, electrical circuitry in said housing connected to said transducer means, said electrical circuitry comprising battery means for supplying power to the electrical circuitry, amplifier means connected to amplify the electrical signal from said transducer means and produce a first output signal in response thereto, timing means for producing a second output signal at fixed intervals of time, each such interval of time being a known fraction of a minute, the fraction having a numerator that is the numeral "1" and a denominator that is an integer; and signalling means responsive to said first and second signals for producing a first humanly sensible signal in response to each of said first output signals, and a second humanly sensible signal distinct from said first humanly sensible signal in response to said second output signal.

2. The apparatus of claim 1 wherein said transducer means includes a light source and a photocell mounted on opposite sides of an enclosure, said enclosure having an aperture therein to receive an extremity of the human body wherein light from such source passes through said extremity to said photocell and wherein said amplifier means is connected to said photocell means for producing an amplified output of said photocell generated signal; and said signaling means produces audible signals and is connected to said amplifier output for producing a first signal upon the appearance of said amplifier output and to said timing means for producing output indications distinct from said first signals, said output indications having fixed intervals of time between them.

3. The apparatus of claim 2 wherein said amplifier means includes an integrated circuit operational amplifier.

4. A portable hand-held human pulse measuring device comprising:

a. a transducer comprising:
      1. a shield formed of a soft material, having an aperture therein capable of receiving a portion of the human hand;
      2. a source of light located on said shield to direct light axially through an aperture in said shield through said portion of said hand;
      3. light responsive means mounted in another aperture in said shield responsive to the light emitted by said light source and changes in the degree of emission thereof caused by said human hand portion;
      4. electrical connector means coupled to said light responsively to transmit the electrical signal generated by said light responsive means;
   b. a portable housing having located thereon an electrical connector received in said electrical connection means;
   c. in said housing, electrical circuit connected to said electrical connector comprising:
      1. battery means for supplying power to the system;

2. switch means connected to said battery means for connecting and disconnecting said battery into and out of circuit relationship with said connector means whereby said battery means may be charged in one position of said switch means and whereby said battery means will supply power to the remaining circuitry of the device when said switch is in the other position; and 3. operational amplifying means connected to receive the output of said light responsive means for amplifying said output;

d. electrical charge and discharge means connected to the output of said amplifier for charging and discharging a capacitor when said capacitor reaches a predetermined charge to generate thereby a signal;

e. speaker means connected to the charging and discharge of said discharge means;

f. light emitting diode means connected to said charging and discharging means for rendering visible the signal generated upon discharge of said discharging means;

g. free running oscillating means connected to such charging and discharging means and to said audible means for producing an audible signal upon a predetermined time interval initiated by the first discharge of said discharging means and;

h. second light emitting diode means connected to said oscillating means for rendering visible the output of said ocsillating means.

* * * * *